United States Patent
Yamazaki

[11] Patent Number: 6,027,422
[45] Date of Patent: Feb. 22, 2000

[54] SWITCHING SYNCHRONOUS APPARATUS FOR FOUR WHEEL DRIVE VEHICLE

[75] Inventor: Nobushi Yamazaki, Tochigi, Japan

[73] Assignee: Tochigi Fuji Sangyo Kabushiki Kaisha, Tochiga-ken, Japan

[21] Appl. No.: 09/149,389

[22] Filed: Sep. 8, 1998

[30] Foreign Application Priority Data

Sep. 11, 1997 [JP] Japan ................................. 9-246625

[51] Int. Cl.$^7$ ............................ F16H 48/06; F16D 11/00
[52] U.S. Cl. ........................................ 475/231; 192/53.36
[58] Field of Search .................... 475/230, 231, 475/237; 192/53.36

[56] References Cited

U.S. PATENT DOCUMENTS

| | | | |
|---|---|---|---|
| 4,679,463 | 7/1987 | Ozaki et al. | 475/231 X |
| 4,732,247 | 3/1988 | Frost | 192/53 F |
| 4,776,228 | 10/1988 | Razzacki et al. | 192/53.36 X |
| 4,998,445 | 3/1991 | Fujiwara | 192/53.36 X |
| 5,125,876 | 6/1992 | Hirota | 475/231 |
| 5,279,401 | 1/1994 | Stall | 475/231 X |
| 5,461,941 | 10/1995 | Young | 475/231 X |
| 5,890,989 | 4/1999 | Yamazaki et al. | 475/230 X |

*Primary Examiner*—Charles A. Marmor
*Assistant Examiner*—Roger Pang
*Attorney, Agent, or Firm*—Graham & James LLP

[57] ABSTRACT

A switching synchronous apparatus for a four wheel drive vehicle in which a drive force is transmitted to a driven side differential gear by connecting the drive force of a transfer capable of attaching and detaching the drive force is disclosed. The apparatus comprising a first rotation member provided in the driven side differential gear and connected to a transfer side, a second rotation member provided in the driven side differential gear and to be connected to the first rotation member, and a synchronous connection mechanism provided in the driven side differential gear and synchronously connecting the first rotation member to the second rotation member in relative. Here, the first rotation member and the second rotation member are synchronously connected to each other by the synchronously connecting mechanism and the drive force becomes in a state capable of being transmitted to the second rotation member.

14 Claims, 5 Drawing Sheets

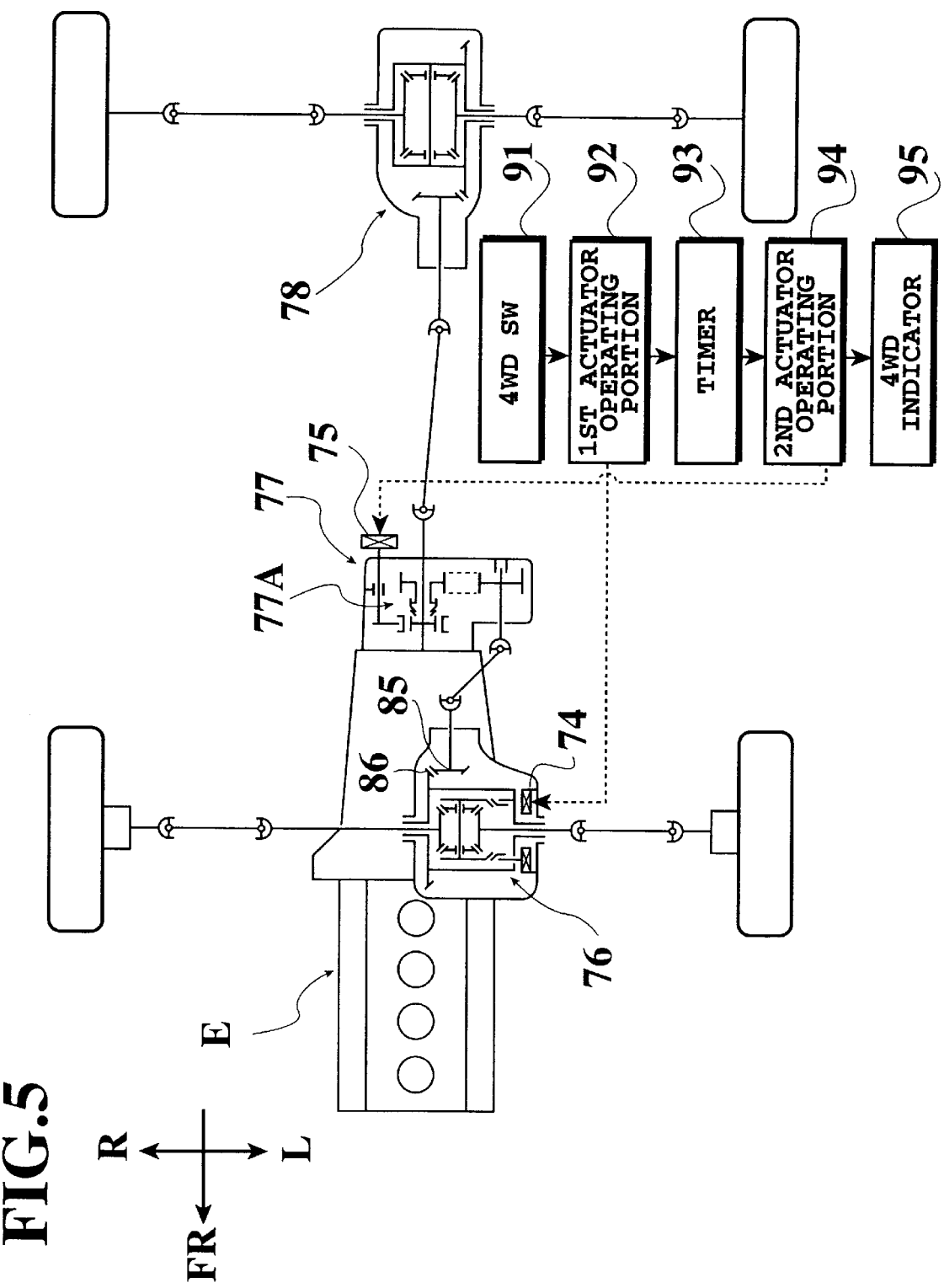

6,027,422

SWITCHING SYNCHRONOUS APPARATUS FOR FOUR WHEEL DRIVE VEHICLE

BACKGROUND OF THE INVENTION

1. Field of the Invention

The present invention relates to a switching synchronous apparatus for a four wheel drive vehicle, and particularly to a switching synchronous apparatus for a four wheel drive vehicle for switching a state between a two wheel drive state and a four wheel drive state by intermittently attaching and detaching a drive force transmission path of a driven side differential gear.

2. Description of the Related Art

Conventionally, as a driven side differential gear for performing a switching control between a two wheel drive state and a four wheel drive state by intermittently attaching and detaching a drive force transmission to both right and left wheels in accordance with intermittently attaching and detaching a part of a drive force transmission path of the driven side differential gear, there has been known a free running differential gear as shown in Japanese Patent Application Examined Publication No. 5-54574.

FIG. 1 shows a structure of such a free running differential gear, in which a drive force from an engine (not shown) is transmitted to a ring gear 16 meshed with a drive pinion 15 in a bevel gear manner, and transmitted to an outer differential case 1 integrally fixing the ring gear 16, thereby rotating the outer differential case 1. In the middle of the outer differential case 1, a dog clutch 11 an attachment and detachment of which is controlled by a shift fork 18 of a lock cylinder 14 disposed outside a differential carrier 17 fixed to a vehicle body side is provided. And it is structured such that a transmission of a drive force to an inner differential case 6 receiving a pair of left and right side gears 4 and 5 meshed with both sides of a plurality of pinion gears 3, through the pinion gears 3 supported in rotatable to a pinion shaft 2 constituting a normal differential gear, is intermittent by the dog clutch 11. In accordance with the structure mentioned above, a switching control between a two wheel drive state and a four wheel drive state of the type, for example, mainly driving rear wheels is performed by intermittently attaching and detaching a drive force to the inner differential case 6 corresponding to the front wheel side.

Further, as a driven side differential gear, there has been known a structure for performing a switching control between a two wheel drive state and a four wheel drive state by intermittently attaching and detaching one of drive axles connected to the left and right wheels of the driven side.

In this case, a four wheel drive vehicle having a driven side differential gear for performing a switching control between a two wheel drive state and a four wheel drive state by intermittently attaching and detaching a power transmission to both right and left wheels in accordance with intermittently attaching and detaching a part of the power transmission path mentioned above is normally separately provided with a transfer, and is structured such that a drive force is transmitted by a connection of the transfer. For example, in the four wheel drive vehicle performing a switching control between a two wheel drive state and a four wheel drive state of the type mainly driving the rear wheels, a drive force is also transmitted to the front wheel side having the driven side differential gear in addition to the usual rear wheel drive state.

Then, in the case of the example of the free running differential gear shown in FIG. 1, it is structured such that when the transfer is connected, the dog clutch 11 in the free running differential gear is also connected in an interlocking manner. In this case, during the two wheel drive state in which the transfer is not connected, a power transmission system from the transfer to the outer differential case 1 through the drive pinion 15 and the ring gear 16 is at a standstill, so that an energy loss is prevented.

That is, in general, regarding the driven side differential gear mentioned above, the switching between the two wheel drive state and the four wheel drive state is correspondingly performed by intermittently attaching and detaching the transfer.

Here, with respect to the switching between the two wheel drive state and the four wheel drive state, a need for increasing a freedom such that a switching can be performed even when a vehicle runs at about 80 km/h has become increased in accordance with a recent popularization of a four wheel drive vehicle.

At a time of switching a state between the two wheel drive state and the four wheel drive state while the vehicle runs in the above manner, particularly switching a state from the two wheel drive state to the four wheel drive state, for example, in the case of the four wheel drive vehicle performing the switching control between the two wheel drive state and the four wheel drive state of the type mainly driving the rear wheels, it is necessary to connect the transfer to the front wheel side at which a drive is stopped so as to branch the drive force from the rear wheel side drive system at which a drive is performed.

Then, a synchronous mechanism is generally provided in the transfer in order to make it possible to connect the transfer during a running of the vehicle. Specifically speaking, the drive pinion 15, the ring gear 16 and the outer differential case 1 corresponding to the side at which the drive force is drawn out in the driven side differential gear in FIG. 1 are synchronously connected to the drive system by the synchronous mechanism of the transfer, and the dog clutch 11 is in a connection state in accordance therewith, so that the drive force can be smoothly connected to the front wheel side through the pinion gear 3 and the inner differential case 6.

However, there still exist vehicles in which the synchronous mechanism is not provided in the transfer.

Further, even on the assumption that the synchronous mechanism is provided in the transfer, in the vehicle mounting an engine generating greater torque in accordance with a progress in a recent engine control technology and the like, since there is a necessity of increasing a synchronous volume of the synchronous mechanism in the transfer, it becomes a great problem at designing in the transfer having a very narrow layout space for placing the elements.

Accordingly, it is currently desired to provide a switching synchronous apparatus for a four wheel drive vehicle which can be sufficiently applied to a vehicle having no synchronous mechanism in the transfer, inherently gives no influence to a structure of the transfer itself, inherently gives no obstacle to a security of a freedom at designing, and can smoothly switch a state between a two wheel drive state and a four wheel drive state, particularly can smoothly switch a state from a two wheel drive state to a four wheel drive state while the vehicle runs.

SUMMARY OF THE INVENTION

An object of the present invention is to provide a switching synchronous apparatus for a four wheel drive vehicle which can smoothly perform a switching between a two wheel drive state and a four wheel drive state in a four wheel drive vehicle without depending upon a presence of a synchronous mechanism of a transfer and a magnitude of its synchronous volume, in an aspect of basically giving no influence to a structure of the transfer itself and in an aspect of basically giving no obstacle to a security of a freedom at designing the transfer itself.

That is, the switching synchronous apparatus for a four wheel drive vehicle in accordance with the present invention is a switching synchronous apparatus for a four wheel drive vehicle in which a drive force is transmitted to a driven side differential gear by connecting a drive force of a transfer capable of intermittently attaching and detaching the drive force, and comprises a first rotation member provided in the driven side differential gear and connected to a transfer side, a second rotation member provided in the driven side differential gear and to be connected to the first rotation member, and a synchronous connection mechanism provided in the driven side differential gear and synchronously connecting the first rotation member to the second rotation member in relative.

Then, the first rotation member and the second rotation member are synchronously connected to each other by the synchronously connecting mechanism and the drive force becomes in a state capable of being transmitted to the second rotation member.

In accordance with the structure mentioned above, since the synchronously connecting mechanism is provided in the driven side differential gear, a switching between the two wheel drive state and the four wheel drive state in the four wheel drive vehicle can be smoothly performed in a state of sufficiently securing a synchronization between the drive side and the driven side without principally requiring any additional construction to the transfer.

Further, since the driven side differential gear has layout space for the components thereof comparatively enough and inherently can take a great synchronous volume, a sufficient synchronous volume can be provided without providing the synchronous connecting mechanism in the transfer side, so that even in the case of using the transfer having no synchronous connecting mechanism, a switching between the two wheel drive state and the four wheel drive state can be performed with a sufficient synchronization.

Accordingly, a switching between the two wheel drive state and the four wheel drive state with a sufficient synchronization can be performed only by replacing the driven side differential gear in the four wheel drive vehicle having a conventional transfer by the structure including the switching synchronous apparatus for the four wheel drive vehicle in accordance with the present invention.

Then, in the switching synchronous apparatus for the four wheel drive vehicle in accordance with the present invention, only the driven side differential gear can employ a structure having the synchronously connecting mechanism.

Further, referring to a more concrete structure, the first rotation member includes a differential case, the second rotation member includes a carrier, the driven side differential gear has a differential gear for distributing and transmitting a drive force input to the differential case to a pair of side gears meshed with a plurality of pinion gears through the plurality of pinion gears rotatable supported to a pinion shaft supported to the carrier and perpendicular to a rotational axis of the differential case, and a synchronously connecting mechanism, and the synchronously connecting mechanism has a clutch ring provided to the differential case and a synchronous ring capable of being communicated with the clutch ring. In this structure, the clutch ring moves the synchronous ring toward the carrier and a slidably contact surface of the synchronous ring is brought into slidable contact with the carrier, whereby the differential case and the carrier are synchronously connected.

Further, in the switching synchronous apparatus for the four wheel drive vehicle in accordance with the present invention, the synchronously connecting mechanism of the driven side differential gear can be made a double-synchronous mechanism.

In accordance with the structure mentioned above, a synchronous volume of the synchronously connecting mechanism in the driven side differential gear can be twice increased, so that a switching between the two wheel drive state and the four wheel drive state with a more sufficient synchronization can be performed. Of course, a requirement of the synchronously connecting mechanism at the transfer side is further reduced.

In this case, a concrete structure of the double-synchronous mechanism is preferably made such as to have a clutch ring provided to the differential case, a first synchronous ring capable of being communicated with the clutch ring, a second synchronous ring communicated with the clutch ring and a slidably contact member communicated with the carrier. And it is preferable that the clutch ring moves the first synchronous ring toward the carrier, the first synchronous ring is brought into slidable contact with the slidably contact member and then the second synchronous ring is brought into slidable contact with the slidably contact member, whereby the differential case and the carrier are synchronously connected to each other.

Further, of course, in the switching synchronous apparatus for the four wheel drive vehicle in accordance with the present invention, in order to further increase the synchronous volume, it is preferable that the transfer is structured in such a manner as to have a synchronously connecting mechanism for synchronously connecting a drive force to the driven side differential gear.

In this case, the synchronous volume of the synchronously connecting mechanism in the driven side differential gear can be set to be greater than the synchronous volume of the synchronously connecting mechanism in the transfer by taking account of a size of the layout space, so that an influence to the construction of the transfer can be minimized.

Then, in the switching synchronous apparatus for the four wheel drive vehicle in accordance with the present invention, since the synchronous volume of the synchronously connecting mechanism in the driven side differential gear can be made great, and the synchronously connecting mechanism is not inherently required in the transfer, it is preferable that the first rotation member and the second rotation member in the driven side differential gear are synchronously connected to each other before the transfer connects the drive force.

In this case, in the case that the transfer has the synchronously connecting mechanism for synchronously connecting the drive force to the driven side differential gear or the like, of course, the transfer side may be first connected.

BRIEF DESCRIPTION OF THE DRAWINGS

FIG. 5 is a skeleton view of the four wheel drive vehicle to which the switching synchronous apparatus for the four wheel drive vehicle in accordance with the second embodiment of the present invention.

DETAILED DESCRIPTION OF THE PREFERRED EMBODIMENTS

Each of embodiments in accordance with the present invention will be described in detail with reference to the drawings.

Figure 1:
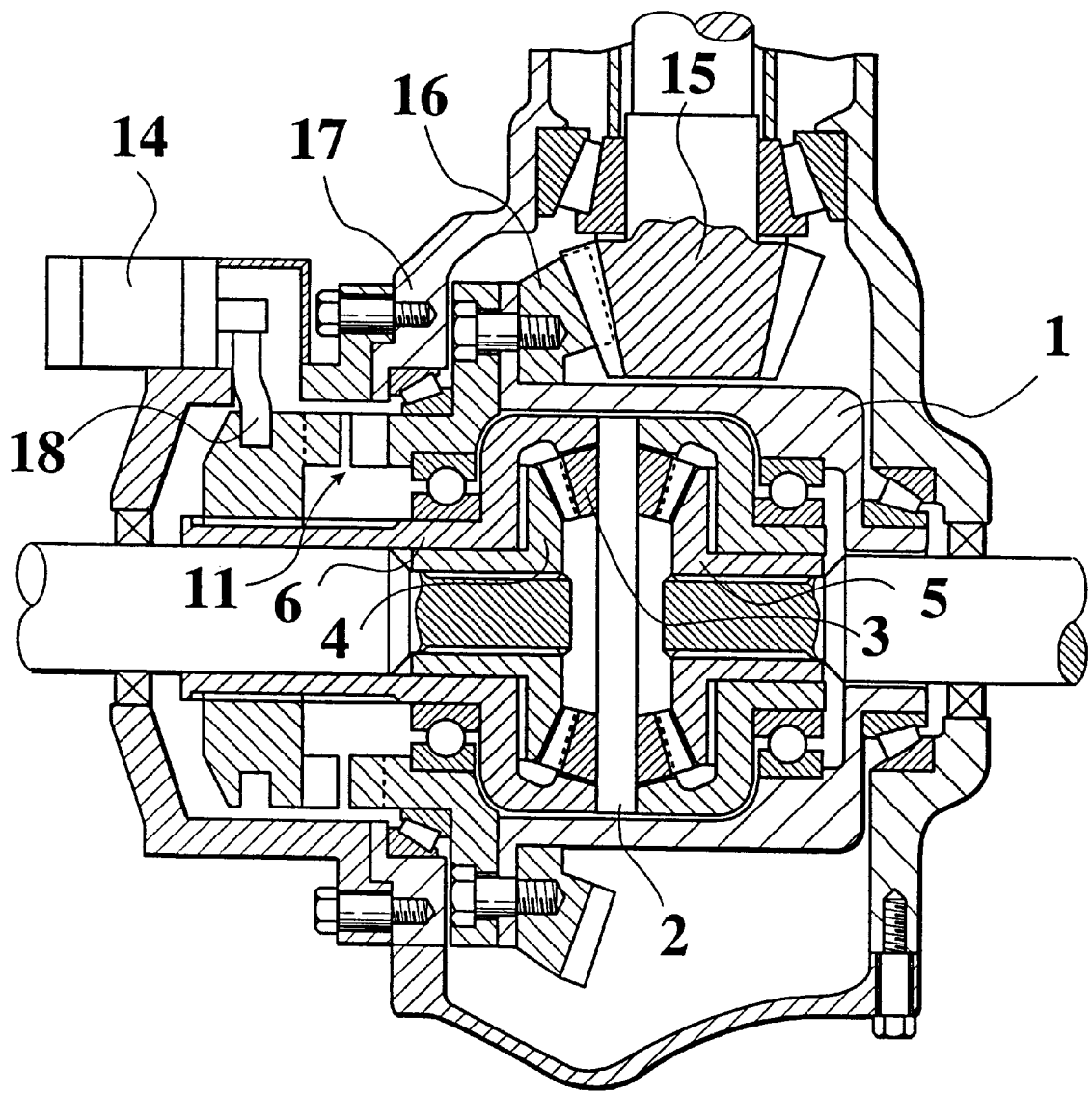
FIG. 1 is a cross sectional view of a prior driven side differential gear.
Figure 2:
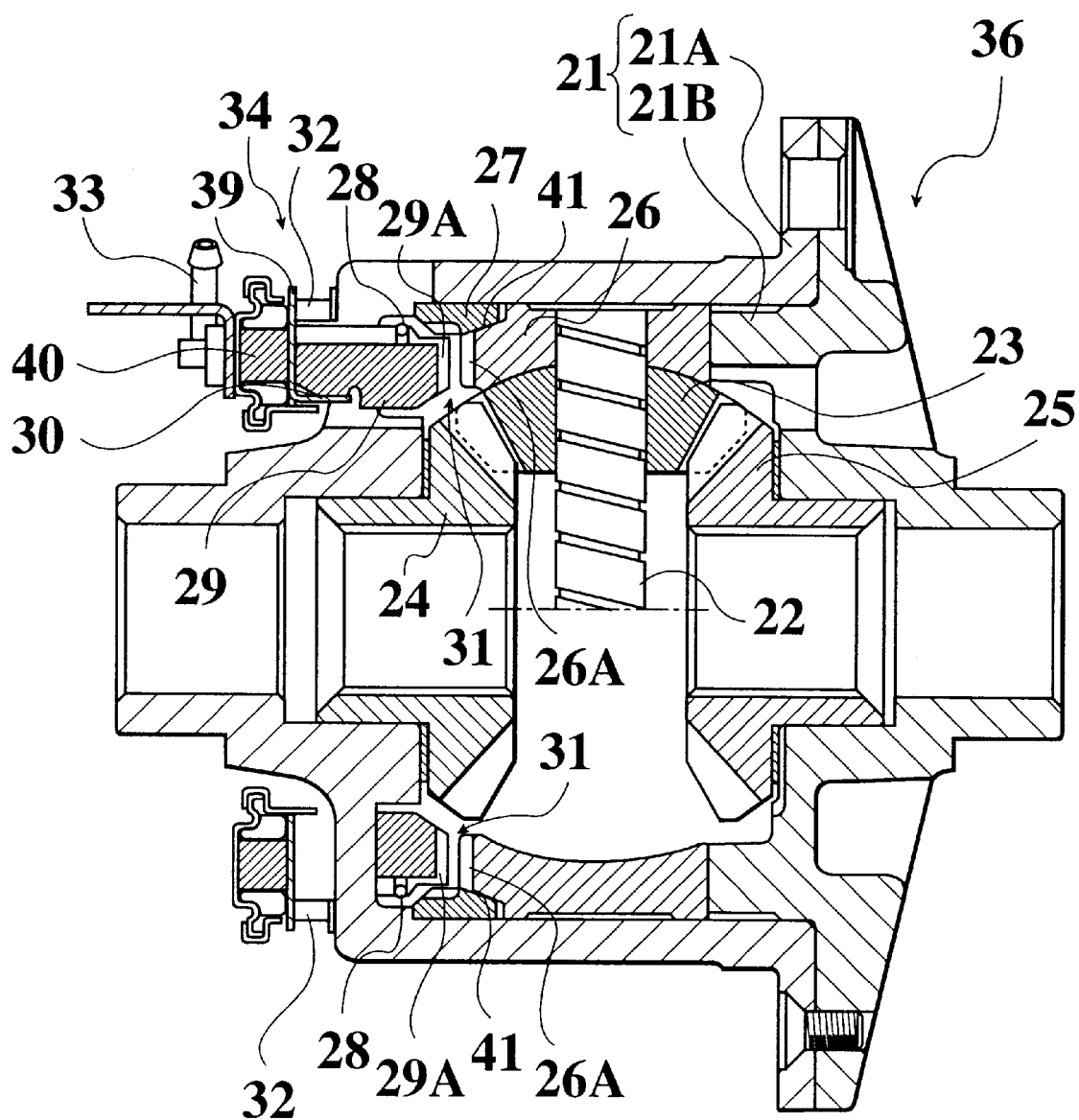
FIG. 2 is a cross sectional view of a switching synchronous apparatus for a four wheel drive vehicle in accordance with a first embodiment of the present invention.
Figure 3:
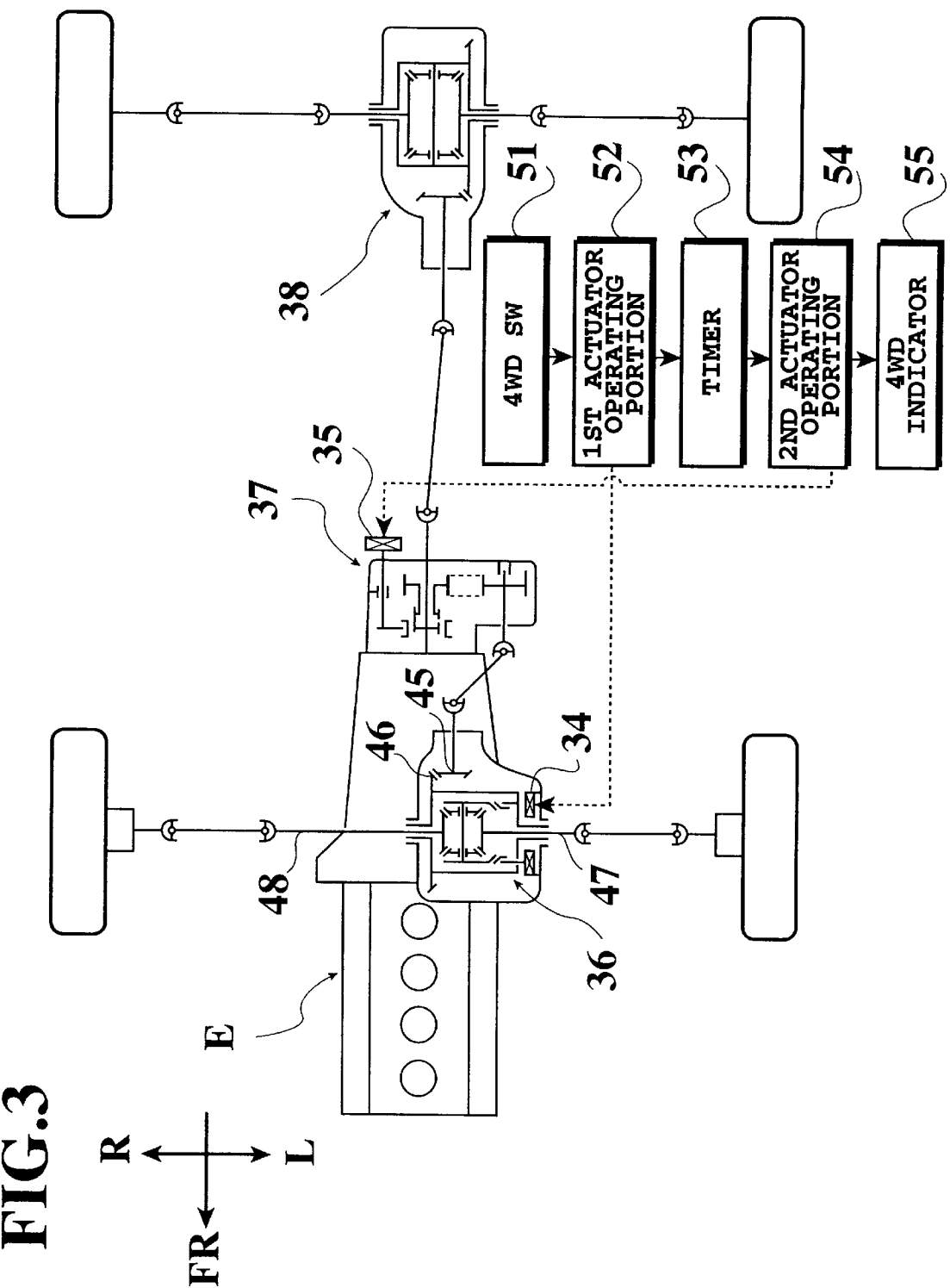
FIG. 3 is a skeleton view of the four wheel drive vehicle to which the switching synchronous apparatus for the four wheel drive vehicle in accordance with the t embodiment of the present invention is applied.

FIGS. 2 and 3 show a first embodiment of a free running differential gear (a driven side differential gear) used for a switching synchronous apparatus for a four wheel drive vehicle in accordance with the present invention, in which FIG. 2 is a totally cross sectional view thereof and FIG. 3 is a totally skeleton view of a four wheel drive vehicle using such a free running differential apparatus.

As shown in FIG. 2, in a free running differential gear 36 in accordance with the embodiment, a drive force from an engine (denoted by a reference symbol E in FIG. 3) is transmitted to a differential case 21 in the free running differential gear 36 through a drive pinion (denoted by a reference numeral 45 in FIG. 3) and a ring gear (denoted by a reference numeral 46 in FIG. 3) by a connection of a transfer (denoted by a reference numeral 37 in FIG. 3). In this case, the differential case 21 are constituted by a left differential case 21A and a right differential case 21B, and they are united by fastening by means of bolts.

The drive force transmitted to the differential case (the outer differential case) 21 is transmitted, through a plurality of pinion gears 23 supported in rotatable to a pinion shaft 22 supported to a carrier (an inner differential case) 26, disposed within the differential case 21, and perpendicular to a rotational axis of the differential case 21, to a pair of left and right side gears 24 and 25 meshed from both sides the plurality of pinion gears 23 so as to distribute its torque. Left and right drive shafts (denoted by a reference numerals 47 and 48 in FIG. 3) are connected to the left and right side gears 24 and 25 by a spline fitting. The differential case 21 and the carrier 26 are fitted in a free state so as to freely rotate to each other, and a connecting apparatus constituting the differential case 21 and the carrier 26 in such a manner that the differential case 21 and the carrier 26 can be attached and detached to each other is provided.

The connecting apparatus in accordance with the embodiment is mainly constituted by a first actuator 34 fixed to a non-rotating portion such as a differential carrier or the like fixed to a vehicle body, a clutch ring (a slider clutch) 29 slid by the first actuator 34 and provided to the differential case 21 and the carrier 26 capable of being connected to the clutch ring 29. The first actuator 34 receives a fluid from a pressure supplying source (not shown) by an air supply pipe 33, expands a diaphragm 30 and is brought into contact with a slidably contact plate 39 adhered to an end surface of the clutch ring 29 provided to the differential case 21 becoming a rotation side after connection during a vehicle running in such a manner as to freely slide in an axial direction of the differential case 21 through a push rod 40. Then, the differential case 21 and the carrier 26 are united by engaging an engagement tooth 29A in an end surface of the clutch ring 29 with an engagement tooth 26A in an end surface of the carrier 26, so that the drive force from the transfer 37 is substantially transmitted to a portion of the free running differential gear 36 constituted by the pinion gear 23, the left and right side gears 24 and 25 and the like. In this case, reference numeral 32 denotes a return spring.

Further, in the connecting apparatus in accordance with the embodiment, it is characterized in that a synchronous ring 27 previously synchronizing rotations of the clutch ring 29 and the carrier 26 prior to a connection thereof is disposed between the clutch ring 29 and the carrier 26.

The synchronous ring 27 is fitted to an inner peripheral side of the differential case 21 in such a manner as to freely rotate with respect to the differential case 21, and is disposed in an outer peripheral side of a connecting portion 31 between the clutch ring 29 and the carrier 26 in an adjacently contact manner. In accordance with a sliding of the clutch ring 29 rightward in FIG. 2 due to a connecting motion of the clutch ring 29 as standstill side, prior to the connection between the clutch ring 29 and the carrier 26, a C clip 28 capable of being received within a groove on the outer peripheral surface of the clutch ring 29 presses the end surface of the synchronous ring 27, thereby pressing the synchronous ring 27 to the carrier 26 as the rotation side during a vehicle running. In this case, a portion between the synchronous ring 27 and the carrier 26 is formed as a slidably contact inclined surface 41. Accordingly, the clutch ring 29 further continues to slide after the synchronous ring 27 and the carrier 26 are gradually connected by the slidably contact inclined surface 41, whereby the C clip 28 enters to the inner peripheral side of the synchronous ring 27 as well as being stored within the groove on the outer peripheral surface of the clutch ring 29, so that an engagement tooth 29A and an engagement tooth 26A constituting a dog clutch connecting portion 31 are connected in a state that the rotation between the clutch ring 29 and the carrier 26 is synchronized and smoothly engaged together with substantially no impact.

Here, with reference to FIG. 3, the free running differential gear 36 in accordance with the embodiment is structured such as to transmit a drive force to the front wheel side in addition to the rear wheel side which is always in a drive state by being connected to the transfer 37. Here, in the drawing, reference numeral 35 denotes a second actuator connecting a drive force to the transfer 37 and reference numeral 38 denotes a rear wheel differential gear.

Specifically speaking, in order to switch a state from the two wheel drive state in which the rear wheel side is in a drive state to the four wheel drive state in which the front wheel side is also made in a drive state, at first a 4WD switch 51 is turned on.

Next, an ON signal of the 4WD switch is transmitted to a first actuator operating portion 52, and an operating signal is transmitted to the first actuator 34 of the free running differential gear 36 from the first actuator operating portion 52 receiving the ON signal, so that the first actuator 34 is operated. Then, as a result, the dog clutch connecting portion 31 becomes in a connecting state.

Next, a time elapsed from the time when the first actuator 34 is operated is measured by a timer 53 receiving the operating signal of the first actuator 34 from the first actuator operating portion 52, and the signal indicating the lapse is transmitted to a second actuator operating portion 54 after a predetermined time has elapsed.

Next, the second actuator operating portion 54 receiving the signal indicating the lapse of the predetermined time transmits the operating signal to the second actuator 35 of the transfer 37, the second actuator 35 is operated, and the transfer 37 is in a connected state, so that a drive force from the transfer 37 is transmitted to the free running differential gear 36. At this connection, since the dog clutch connecting portion 31 of the free running differential gear 36 has been already in the connecting state, it corresponds to that a drive state of the four wheel drive vehicle is switched from the two wheel drive state in which the rear wheel side is driven to the four wheel drive state in which the front wheel side is also driven.

Then, at this time, the second actuator operating portion 54 transmits an indicating signal to a 4WD indicator 55, and the 4WD indicator 55 is lighted and indicates that the state is in the four wheel drive state.

In this case, the predetermined time by the timer 53 corresponds to a time at which a connection-of the dog clutch connecting portion 31 of the free running differential gear 36 is completely finished and this time may be previously set. Of course, the predetermined time may be directly measured by a detecting sensor of a meshing position of the clutch ring 29, an ON-OFF switch or the like.

Figure 4:
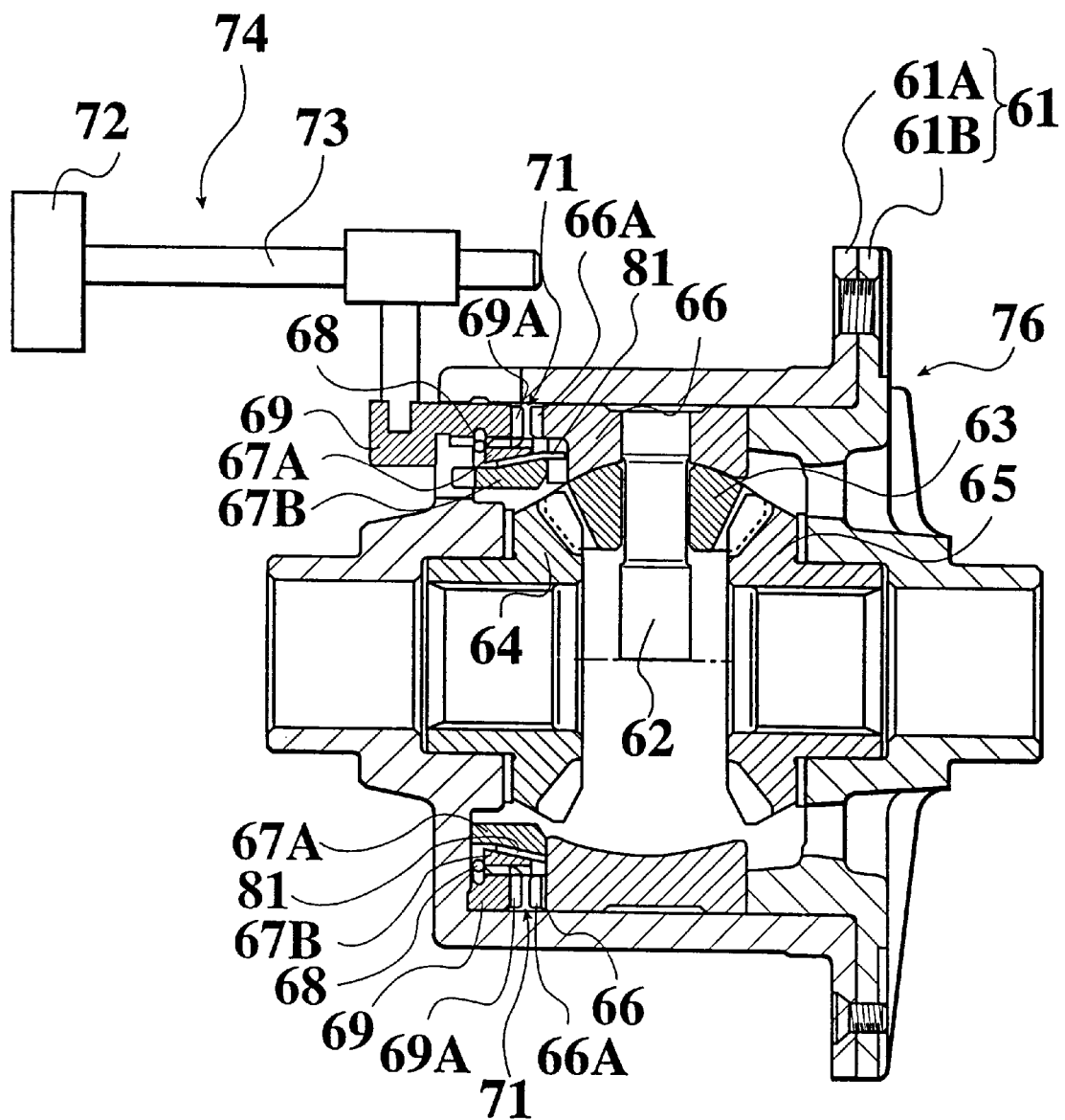
FIG. 4 is a cross sectional view of a switching synchronous apparatus for a four wheel drive vehicle in accordance with a se ed t of the present invention.

Next, FIGS. 4 and 5 show a second embodiment of a free running differential gear (a driven side differential gear) used for the switching synchronous apparatus for the four wheel drive vehicle in accordance with the present invention, in which FIG. 4 is a totally cross sectional view thereof, and FIG. 5 is a totally skeleton view of the four wheel drive vehicle using the free running differential gear.

As shown in FIG. 4, also in a free running apparatus 76 in accordance with this embodiment, a drive force from an engine (denoted by a reference symbol E in FIG. 5) is transmitted to a differential case 61 comprising a left differential case 61A and a right differential case 61B of the free running differential gear 76 through a drive pinion (denoted by a reference numeral 85 in FIG. 5) and a ring gear (denoted by a reference numeral 86 in FIG. 5) by a connection of a transfer (denoted by a reference numeral 77 in FIG. 5), in the same manner as that of the first embodiment.

Then, the drive input transmitted to the differential case 61 is transmitted, through a plurality of pinion gears 63 supported in rotatable to the pinion shaft 62 supported to the carrier 66, fitted and disposed within the differential case 61 in a state of freely rotating with the differential case 61 to each other, and perpendicular to the rotational axis of the differential case 61, to a pair of left and right side gears 64 and 65 meshed from both sides of the plurality of pinion gears 63 so as to distribute torque in the same manner as that of the first embodiment.

In this case, a main difference in the construction of this embodiment in comparison with the first embodiment exists in a detailed structure of a connecting apparatus intermittently attaching and detaching the differential case 61 to and from the carrier 66 and a structure of a synchronous mechanism 77A provided in the transfer 77.

The connecting apparatus in accordance with the embodiment has a first actuator 74 fixed to the vehicle body, a clutch ring 69 slid by the first actuator 74 and provided to the differential case 61, a carrier 66 capable of being connected to the clutch ring 69 and a synchronous construction provided between the clutch ring 69 and the carrier 66 and in the inner peripheral side of the connecting portion 71 thereof.

The first actuator 74 is provided with a drive source 72 and a rod member 73 connected to the drive source 72 and transmitting the drive force thereof to the clutch ring 69.

Here, in the first embodiment, the drive force is applied on substantially the same axis as the moving direction in which the clutch ring 29 slides and moves, however, in this embodiment, the drive force along an axis in parallel to the moving direction of the clutch ring 69 is applied to the clutch ring 69 through the rod member 73 having a portion extending in a direction perpendicular to the moving direction of the clutch ring 69.

Then, the first actuator 74 slides and moves the clutch ring 69 so as to engage an engagement tooth 69A provided on an end surface of the clutch ring 69 with an engagement tooth 66A on an end surface of the carrier 66, thereby uniting the differential case 61 with the carrier 66, so that drive force from the transfer 77 is substantially transmitted to the free running differential gear 76.

More specifically speaking, the connecting apparatus in accordance with this embodiment has a first synchronous ring 67A fitted in such a manner as to integrally rotate with the clutch ring 69, a second synchronous ring 67B fitted in such a manner as to integrally rotate with the differential case 61, and a slidably contact member 81 provided between the first synchronous ring 67A and the second synchronous ring 67B and fitted in such a manner as to be integrally rotated with the carrier 66. The slidably contact member 81 has slidably contact inclined surfaces, at its both sides, one of which is opposed to the first synchronous ring 67A and the other of which is opposed to the second synchronous ring 67B, and each of the slidably contact inclined surfaces is brought into slidable contact with each corresponding surface of the first synchronous ring 67A and the second synchronous ring 67B.

And, when the first actuator 74 slides and moves the clutch ring 69 rightward in FIG. 4, a C clip 68 capable of being received within the groove of the inner peripheral surface of the clutch ring 69 presses an end surface of the first synchronous ring 67A, and starts pressing the first synchronous ring 67A to the slidably contact member 81 mounted to the carrier 66 corresponding to a rotating side during a vehicle running. Accordingly, the first synchronous ring 67A and the slidably contact inclined surface of the slidably contact member 81 close to the first synchronous ring 67A begin to be brought into contact with each other.

Next, the slidably contact member 81 in which the slidably contact inclined surface is brought into contact with the first synchronous ring 67A in the above manner also begins to be brought into contact with the second synchronous ring 67B and the slidably contact inclined surface close to the second synchronous ring 67B of the slidably contact member 81 since the first actuator 74 continues to slide the clutch ring 69 and the C clip 68 continues to press the end surface of the first synchronous ring 67A.

Then, since the first actuator 74 continues to slide the clutch ring 69, the C clip 68 enters to the outer peripheral side of the first synchronous ring 67A as well as being stored within the groove on the inner peripheral surface of the clutch ring 69, and with respect to the slidably contact inclined surface in the both sides of the slidably contact member 81, with maintaining a slidably contact state with each of the first synchronous ring 67A and the second synchronous ring 67B, the engagement tooth 69A provided on the end surface of the clutch ring 69 is engaged with the engagement tooth 66A on the end surface of the carrier 66.

Accordingly, the engagement teeth 69A and 66A constituting the dog clutch connecting portion 71 can be smoothly connected to each other with substantially no impact and in a state that the rotation between the clutch ring 69 and the carrier 66 is synchronized.

Here, in this embodiment, since a so-called double synchronous mechanism using both of the slidably contact inclined surfaces of the slidably contact member 81 is realized, it is apparent that the synchronous volume of the free running differential gear 76 is twice increased in comparison with the first embodiment having only one slidably contact inclined surface.

Further, the synchronous volume of the free running differential gear 76 is set to be greater than the synchronous volume of the transfer 77.

Besides, as is understood by referring to FIG. 5, the free running differential gear 76 in accordance with this embodiment can transmit the drive force to the front wheel side by being connected to the transfer 77 in addition to the rear wheel side which is always in the drive state in the same manner as that of the first embodiment.

However, in addition, in this embodiment, the synchronous mechanism 77A is also provided in the transfer 77, so that the synchronous volume at a time of switching between the two wheel drive state and the four wheel drive state is significantly increased together with the free running differential gear 76 having the double synchronous mechanism in comparison with the first embodiment.

Here, in the drawings, reference numeral 75 denotes a second actuator performing a connection of the drive force to the transfer 77, and reference numeral 78 denotes a rear wheel differential gear.

Also in this embodiment, specifically speaking, in order to switch the state from the two wheel drive state in which the rear wheel side is in the drive state to the four wheel drive state in which the front wheel side is also in the drive state, at first a 4WD switch 91 is turned on.

Next, an ON signal of the 4WD switch is transmitted to a first actuator operating portion 92, and an operating signal is transmitted to the first actuator 74 of the free running differential gear 76 from the first actuator operating portion 92 receiving the ON signal, so that the first actuator 74 is operated. Then, as a result, the dog clutch connecting portion 71 becomes in a connecting state.

As mentioned above, the first actuator 74 is first operated so as to synchronously connect the free running differential gear 76 because it is taken into consideration that the synchronous volume of the free running differential gear 76 is greater than the synchronous volume of the transfer 77.

Next, a time elapsed from the time when the first actuator 74 is operated is measured by a timer 93 receiving the operating signal of the first actuator 74 from the first actuator operating portion 92, and the signal indicating the lapse is transmitted to a second actuator operating portion 94 after a predetermined time has elapsed.

Next, the second actuator operating portion 94 receiving the signal indicating the lapse of the predetermined time transmits the operating signal to the second actuator 75 of the transfer 77, the second actuator 75 is operated, and the transfer 77 is in a connected state, so that a drive force from the transfer 77 is transmitted to the free running differential gear 76. In this case, since the synchronous mechanism 77A is provided in the transfer 77, the connection between the transfer 77 and the free running differential gear 77A becomes a synchronous connection.

At this connection, since the dog clutch connecting portion 71 of the free running differential gear 76 has been already in the connecting state, it corresponds to that a drive state of the four wheel drive vehicle is switched from the two wheel drive state in which the rear wheel side is driven to the four wheel drive state in which the front wheel side is also driven.

Further, in accordance with the embodiment, with respect to the free running differential gear 76, the synchronous connection by means of the double synchronous mechanism is performed at a time of connection thereof, and also with respect to the transfer 77, the synchronous connection by means of the synchronous mechanism is performed at a time of connection thereof, so the switching of the drive state of the four wheel drive vehicle significantly increasing the synchronous volume can be performed.

Then, also in accordance with the embodiment, the second actuator operating portion 94 finally transmits the indicating signal to the 4WD indicator 95, and the 4WD indicator 95 is lighted so as to indicate the 4 wheel drive state.

Here, in this embodiment, since the synchronous volume at a time of switching the drive state of the four wheel drive vehicle has room to spare, it is possible to first start the second actuator 75 of the transfer 77 and later start the first actuator 74 of the free running differential gear 76, that is, to first connect the transfer 77 side to the drive force and later connect the free running differential gear 76 to the drive force.

Further, in each of the embodiments mentioned above, the description is given to the four wheel drive vehicle of the type mainly driving the rear wheel side which can switch the state between the two wheel drive state and the four wheel drive state, however, the present invention can be also applied to the vehicle of the type mainly driving the front wheel side.

Further, in each of the embodiments mentioned above, with respect to the structure of the differential gear (the structure of the differential gear set or the like in the free running differential gear, the so-called axle disconnection differential gear or the like used for the driven side differential gear, and the like), the structure of the actuator, the structure of the connecting apparatus (the arrangement of the connecting apparatus, the separated side gear itself serving as the connecting apparatus, and the like), the synchronous mechanism and the like, the other aspects can be, of course, employed as occasion demands as far as the same function can be essentially obtained.

In addition, though in each of the embodiments mentioned above, the dog type connecting apparatus is typically used, another type connecting apparatus in which, for example, sleeve type engagement teeth are provided in stead of the dog type engagement teeth can be used.

What is claimed is:

1. A switching synchronous apparatus for a four wheel drive vehicle in which a drive force is transmitted to a driven side differential gear by connecting said drive force of a transfer capable of attaching and detaching said drive force, comprising:

a first rotation member provided in said driven side differential gear and connected to a side of said transfer;

a second rotation member provided in said driven side differential gear and to be connected to said first rotation member; and a synchronous connection mechanism provided in said driven side differential gear and synchronously connecting said first rotation member to said second rotation member, wherein said first rotation member includes a differential case and said synchronous connection mechanism is accommodated in said differential case, and wherein said first rotation member and said second rotation member are synchronously connected to each other by said synchronously connecting mechanism and said drive force becomes in a state capable of being transmitted to said second rotation member.

2. A switching synchronous apparatus for a four wheel drive vehicle as claimed in claim 1, wherein only said driven side differential gear has said synchronously connecting mechanism.

3. A switching synchronous apparatus for a four wheel drive vehicle as claimed in claim 1, wherein said second rotation member includes a carrier, and said driven side differential gear has a differential gear, distributing and transmitting said drive force input to said differential case to a pair of side gears meshed with a plurality of pinion gears through said plurality of pinion gears rotatably supported to a pinion shaft supported to said carrier and perpendicular to a rotational axis of said differential case, and said synchronously connecting mechanism, said synchronously connecting mechanism having a clutch ring provided to said differential case and a synchronous ring capable of being communicated with said clutch ring, and said clutch ring moving said synchronous ring toward said carrier such that a slidably contact surface of said synchronous ring is brought into slidable contact with said carrier, whereby said differential case and said carrier are synchronously connected.

4. A switching synchronous apparatus for a four wheel drive vehicle as claimed in claim 1, wherein said synchronously connecting mechanism of said driven side differential gear is a double synchronous mechanism.

5. A switching synchronous apparatus for a four wheel drive vehicle as claimed in claim 1, wherein said second rotation member includes a carrier, and said driven side differential gear has a differential gear, distributing and transmitting said drive force input to said differential case to a pair of side gears meshed with a plurality of pinion gears through said plurality of pinion gears rotatably supported to a pinion shaft supported to said carrier and perpendicular to a rotational axis of said differential case, and said synchronously connecting mechanism, said synchronously connecting mechanism having a clutch ring provided to said differential case, a first synchronous ring capable of being communicated with said clutch ring, a second synchronous ring communicated with said differential case and a slidably contact member communicated with said carrier, and said clutch ring moving said first synchronous ring toward said carrier such that said first synchronous ring is brought into slidable contact with said slidably contact member and said second synchronous ring is additionally brought into slidable contact with said slidably contact member, whereby said differential case and said carrier are synchronously connected.

6. A switching synchronous apparatus for a four wheel drive vehicle as claimed in claim 1, wherein said transfer has a synchronously connecting mechanism synchronously connecting said drive force to said driven side differential gear.

7. A switching synchronous apparatus for a four wheel drive vehicle as claimed in claim 1, wherein said transfer has a synchronously connecting mechanism synchronously connecting said drive force to said driven side differential gear, and a synchronous volume of said synchronously connecting mechanism in said driven side differential gear is greater than a synchronous volume of said synchronously connecting mechanism in said transfer.

8. A switching synchronous apparatus for a four wheel drive vehicle in which a drive force is transmitted to a driven side differential gear by connecting said drive force of a transfer capable of attaching and detaching said drive force, comprising:

a first rotation member provided in said driven side differential gear and connected to a side of said transfer;

a second rotation member provided in said driven side differential gear and to be connected to said first rotation member; and a synchronous connection mechanism provided in said driven side differential gear and synchronously connecting said first rotation member to said second rotation member, wherein said first rotation member and said second rotation member are synchronously connected to each other by said synchronously connecting mechanism and said drive force becomes in a state capable of being transmitted to said second rotation member, wherein said first rotation member and said second rotation member in said driven side differential gear are synchronously connected to each other before said transfer connects said drive force.

9. A switching synchronous apparatus for a four wheel drive vehicle as claimed in claim 8, wherein only said driven side differential gear has said synchronously connecting mechanism.

10. A switching synchronous apparatus for a four wheel drive vehicle as claimed in claim 8 wherein said first rotation member includes a differential case and said second rotation member includes a carrier, and said driven side differential gear has a differential gear, distributing and transmitting said drive force input to said differential case to a pair of side gears meshed with a plurality of pinion gears through said plurality of pinion gears rotatably supported to a pinion shaft supported to said carrier and perpendicular to a rotational axis of said differential case, and said synchronously connecting mechanism, said synchronously connecting mechanism having a clutch ring provided to said differential case and a synchronous ring capable of being communicated with said clutch ring, and said clutch ring moving said synchronous ring toward said carrier such that a slidably contact surface of said synchronous ring is brought into slidable contact with said carrier, whereby said differential case and said carrier are synchronously connected.

11. A switching synchronous apparatus for a four wheel drive vehicle as claimed in claim 8 wherein said synchronously connecting mechanism of said driven side differential gear is a double synchronous mechanism.

12. A switching synchronous apparatus for a four wheel drive vehicle as claimed in claim 8 wherein said first rotation member includes a differential case and said second rotation member includes a carrier, and said driven side differential gear has a differential gear, distributing and transmitting said drive force input to said differential case to a pair of side gears meshed with a plurality of pinion gears through said plurality of pinion gears rotatably supported to a pinion shaft supported to said carrier and perpendicular to a rotational axis of said differential case, and said synchronously connecting mechanism, said synchronously connecting mechanism having a clutch ring provided to said differential case, a first synchronous ring capable of being communicated with said clutch ring, a second synchronous ring communicated with said clutch ring and a slidably contact member communicated with said carrier, and said clutch ring moving said first synchronous ring toward said carrier such that said first synchronous ring is brought into slidable contact with said slidably contact member and said second synchronous ring is additionally brought into slidable contact with said slidably contact member, whereby said differential case and said carrier are synchronously connected.

13. A switching synchronous apparatus for a four wheel drive vehicle as claimed in claim 8, wherein said transfer has a synchronously connecting mechanism synchronously connecting said drive force to said driven side differential gear.

14. A switching synchronous apparatus for a four wheel drive vehicle as claimed in claim 8, wherein said transfer has a synchronously connecting mechanism synchronously connecting said drive force to said driven side differential gear, and a synchronous volume of said synchronously connecting mechanism in said driven side differential gear is greater than a synchronous volume of said synchronously connecting mechanism in said transfer.

* * * * *